United States Patent
Chang et al.

(10) Patent No.: US 12,156,271 B2
(45) Date of Patent: Nov. 26, 2024

(54) APPARATUSES AND METHODS FOR EXPEDITED TUNNEL ESTABLISHMENT WITH A NON-THIRD GENERATION PARTNERSHIP PROJECT (3GPP) INTERWORKING GATEWAY TO ACCESS A 3GPP NETWORK

(71) Applicant: MEDIATEK INC., Hsinchu (TW)

(72) Inventors: Hui-Ling Chang, Hsinchu (TW);
Po-Chun Lee, Hsinchu (TW);
Yuan-Chieh Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 158 days.

(21) Appl. No.: 17/668,583

(22) Filed: Feb. 10, 2022

(65) Prior Publication Data
US 2023/0254926 A1    Aug. 10, 2023

(51) Int. Cl.
*H04W 76/12*    (2018.01)
*H04W 76/18*    (2018.01)

(52) U.S. Cl.
CPC .................. *H04W 76/18* (2018.02)

(58) Field of Classification Search
CPC ..... H04W 76/12; H04W 76/18; H04W 76/16; H04W 4/24; H04W 16/14; H04L 12/1407
See application file for complete search history.

(56) References Cited

U.S. PATENT DOCUMENTS

| | | | |
|---|---|---|---|
| 2008/0195733 A1* | 8/2008 | Detienne | H04L 43/00 709/224 |
| 2015/0350983 A1 | 12/2015 | Kwok et al. | |
| 2018/0092140 A1* | 3/2018 | Dong | H04W 76/12 |
| 2018/0115549 A1 | 4/2018 | Chen et al. | |
| 2019/0021064 A1 | 1/2019 | Ryu et al. | |
| 2023/0254692 A1* | 8/2023 | Kim | H04W 12/50 726/6 |

OTHER PUBLICATIONS

Chinese language office action dated Apr. 10, 2023, issued in application No. TW 111111220.

* cited by examiner

*Primary Examiner* — Anez C Ebrahim
(74) *Attorney, Agent, or Firm* — McClure, Qualey & Rodack, LLP

(57) ABSTRACT

A method for expedited tunnel establishment with a non-Third Generation Partnership Project (3GPP) interworking gateway to access a 3GPP network is provided. A User Equipment (UE) initiates establishment of an Internet Protocol secure (IPsec) tunnel with a first non-3GPP interworking gateway associated with the 3GPP network. The UE probes availability of a second non-3GPP interworking gateway associated with the 3GPP network before the IPsec tunnel with the first non-3GPP interworking gateway is established successfully. The UE initiates establishment of an IPsec tunnel with the second non-3GPP interworking gateway in response to failing to establish the IPsec tunnel with the first non-3GPP interworking gateway and the second non-3GPP interworking gateway being available. The UE accesses the 3GPP network over the IPsec tunnel with the second non-3GPP interworking gateway.

18 Claims, 7 Drawing Sheets

APPARATUSES AND METHODS FOR EXPEDITED TUNNEL ESTABLISHMENT WITH A NON-THIRD GENERATION PARTNERSHIP PROJECT (3GPP) INTERWORKING GATEWAY TO ACCESS A 3GPP NETWORK

BACKGROUND OF THE APPLICATION

Field of the Application

The application generally relates to mobile communications, and more particularly, to apparatuses and methods for expedited tunnel establishment with a non-Third Generation Partnership Project (3GPP) interworking gateway to access a 3GPP network.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), including RATs specified by the Third Generation Partnership Project (3GPP) (referred to herein as 3GPP RATs) and RATs not specified by 3GPP (referred to herein as non-3GPP RATs).

Non-3GPP RATs may include Wireless-Fidelity (Wi-Fi) technology, Bluetooth (BT) technology, Zigbee technology, and others, while 3GPP RATs may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Long Term Evolution (LTE) technology, TD-LTE technology, LTE-Advanced (LTE-A) technology, New Radio (NR) technology, etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

To an increasing extent, most UEs may support multiple RATs to provide users with more flexible mobile communications at all times. For example, a UE may support one or more 3GPP RATs and a non-3GPP RAT, wherein the non-3GPP RAT may provide better service quality in indoor environments than the 3GPP RAT(s), while the 3GPP RAT(s) may provide better service quality in outdoor environments than the non-3GPP RAT.

For interoperability between 3GPP and non-3GPP networks, 3GPP has defined the interworking model between 3GPP and non-3GPP networks, which introduces the role of a non-3GPP interworking gateway. A non-3GPP interworking gateway is dedicated for providing a secure tunnel between a UE and a 3GPP network over non-3GPP radio access (e.g., Wi-Fi radio access), and the operator may deploy a plurality of non-3GPP interworking gateways for load balancing or other purposes.

In conventional practice, when provided with information about multiple non-3GPP interworking gateways, a UE will try to establish a secure tunnel with the non-3GPP interworking gateways one at a time, and each time, the UE will keep retrying with only one non-3GPP interworking gateway until the maximum number of retries is reached. If the UE hasn't received any response from the current non-3GPP interworking gateway before reaching the maximum number of retries, it goes on to try the next non-3GPP interworking gateway. In cases where the UE fails to establish a secure tunnel with a non-3GPP interworking gateway, it has been observed that the period of time for retrying with the same non-3GPP interworking gateway may be as long as one minute. Consequently, it may take a long time before the UE successfully establishes a secure tunnel with a non-3GPP interworking gateway and accesses a 3GPP network over the secure tunnel to obtain mobile services. FIG. 1 is a schematic diagram illustrating the tunnel establishment attempts with multiple non-3GPP interworking gateways in conventional practice. As shown in FIG. 1, $T_{fail}$ denotes the period of time that the UE spent retrying the same non-3GPP interworking gateway and failing to establish a secure tunnel before reaching the maximum number of retries, and if the fourth non-3GPP interworking gateway is the only available non-3GPP interworking gateway, it may take $3*T_{fail}+T_{succ}$ (=3*1 minutes+150 milliseconds) before the UE can access the 3GPP network via a secure tunnel with a non-3GPP interworking gateway.

A solution is sought.

BRIEF SUMMARY OF THE APPLICATION

The present application proposes to expedite the tunnel establishment process by allowing a UE to start probing availabilities of other non-3GPP interworking gateways before it successfully establishes a secure tunnel with the current non-3GPP interworking gateway. Advantageously, the UE may establish a secure tunnel with another non-3GPP interworking gateway that has been probed to be available, as soon as it has failed the tunnel establishment with the current non-3GPP interworking gateway. By contrast, in conventional practice, the UE simply goes on to try establishing a secure tunnel with the next non-3GPP interworking gateway without knowing if the next non-3GPP interworking gateway is available or not, which may cause unnecessary waste of time.

In one aspect of the application, a method executed by a UE is provided. The method comprises the following steps: initiating establishment of an Internet Protocol secure (IPsec) tunnel with a first non-3GPP interworking gateway associated with a 3GPP network; probing availability of a second non-3GPP interworking gateway associated with the 3GPP network before the IPsec tunnel with the first non-3GPP interworking gateway is established successfully; initiating establishment of an IPsec tunnel with the second non-3GPP interworking gateway in response to failing to establish the IPsec tunnel with the first non-3GPP interworking gateway and the second non-3GPP interworking gateway being available; and accessing the 3GPP network over the IPsec tunnel with the second non-3GPP interworking gateway.

In another aspect of the application, a UE comprising a wireless transceiver and a controller is provided. The wireless transceiver is configured to perform wireless transmission and reception to and from a non-3GPP access network. The controller is configured to initiate establishment of an IPsec tunnel with a first non-3GPP interworking gateway associated with a 3GPP network via the wireless transceiver, probe availability of a second non-3GPP interworking gateway associated with the 3GPP network via the wireless transceiver before the IPsec tunnel with the first non-3GPP interworking gateway is established successfully, initiate establishment of an IPsec tunnel with the second non-3GPP interworking gateway via the wireless transceiver in response to failing to establish the IPsec tunnel with the first non-3GPP interworking gateway and the second non-3GPP interworking gateway being available, and access the 3GPP network over the IPsec tunnel with the second non-3GPP interworking gateway.

In one example, the UE starts a first timer in response to initiating establishment of the IPsec tunnel with the first non-3GPP interworking gateway, wherein the probing of availability of the second non-3GPP interworking gateway is performed in response to the first timer expiring.

In one example, the UE determines that it fails to establish the IPsec tunnel with the first non-3GPP interworking gateway in response to a maximum number of retries of the tunnel establishment with the first non-3GPP interworking gateway being reached.

In one example, the probing of availability of the second non-3GPP interworking gateway comprises: sending an IKE_SA_INIT request to the second non-3GPP interworking gateway; determining that the second non-3GPP interworking gateway is available in response to receiving an IKE_SA_INIT response from the second non-3GPP interworking gateway; and determining that the second non-3GPP interworking gateway is unavailable in response to not receiving an IKE_SA_INIT response from the second non-3GPP interworking gateway.

In one example, the determination that the second non-3GPP interworking gateway is unavailable is performed in response to a maximum number of retries of sending the IKE_SA_INIT request being reached.

In one example, the probing of availability of the second non-3GPP interworking gateway does not comprise sending or receiving any IKE_SA_AUTH message to or from the second non-3GPP interworking gateway.

In one example, the probing of availability of the second non-3GPP interworking gateway further comprises: starting a second timer in response to receiving an IKE_SA_INIT response from the second non-3GPP interworking gateway.

In one example, the initiating of establishment of the IPsec tunnel with the second non-3GPP interworking gateway does not comprise sending another IKE_SA_INIT request to the second non-3GPP interworking gateway, in response to the second timer not expiring before the initiating of establishment of the IPsec tunnel with the second non-3GPP interworking gateway. Alternatively, the initiating of establishment of the IPsec tunnel with the second non-3GPP interworking gateway comprises sending another IKE_SA_INIT request to the second non-3GPP interworking gateway, in response to the second timer expiring before the initiating of establishment of the IPsec tunnel with the second non-3GPP interworking gateway.

In one example, the first non-3GPP interworking gateway has a higher precedence over the second non-3GPP interworking gateway, and the method further comprising: probing availability of a third non-3GPP interworking gateway before the IPsec tunnel with the first non-3GPP interworking gateway is established successfully; wherein the initiating of establishment of the IPsec tunnel with the second non-3GPP interworking gateway is performed in response to the second non-3GPP interworking gateway having a higher precedence over the third non-3GPP interworking gateway.

In one example, the non-3GPP interworking gateway is an evolved Packet Data Gateway (ePDG) when the 3GPP network is a fourth Generation (4G) network; or the non-3GPP interworking gateway is a Non-3GPP Inter-Working Function (N3IWF) when the 3GPP network is a fifth Generation (5G) network.

Other aspects and features of the present application will become apparent to those with ordinary skill in the art upon review of the following descriptions of specific embodiments of the apparatuses and methods for expedited tunnel establishment with a non-3GPP interworking gateway to access a 3GPP network.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
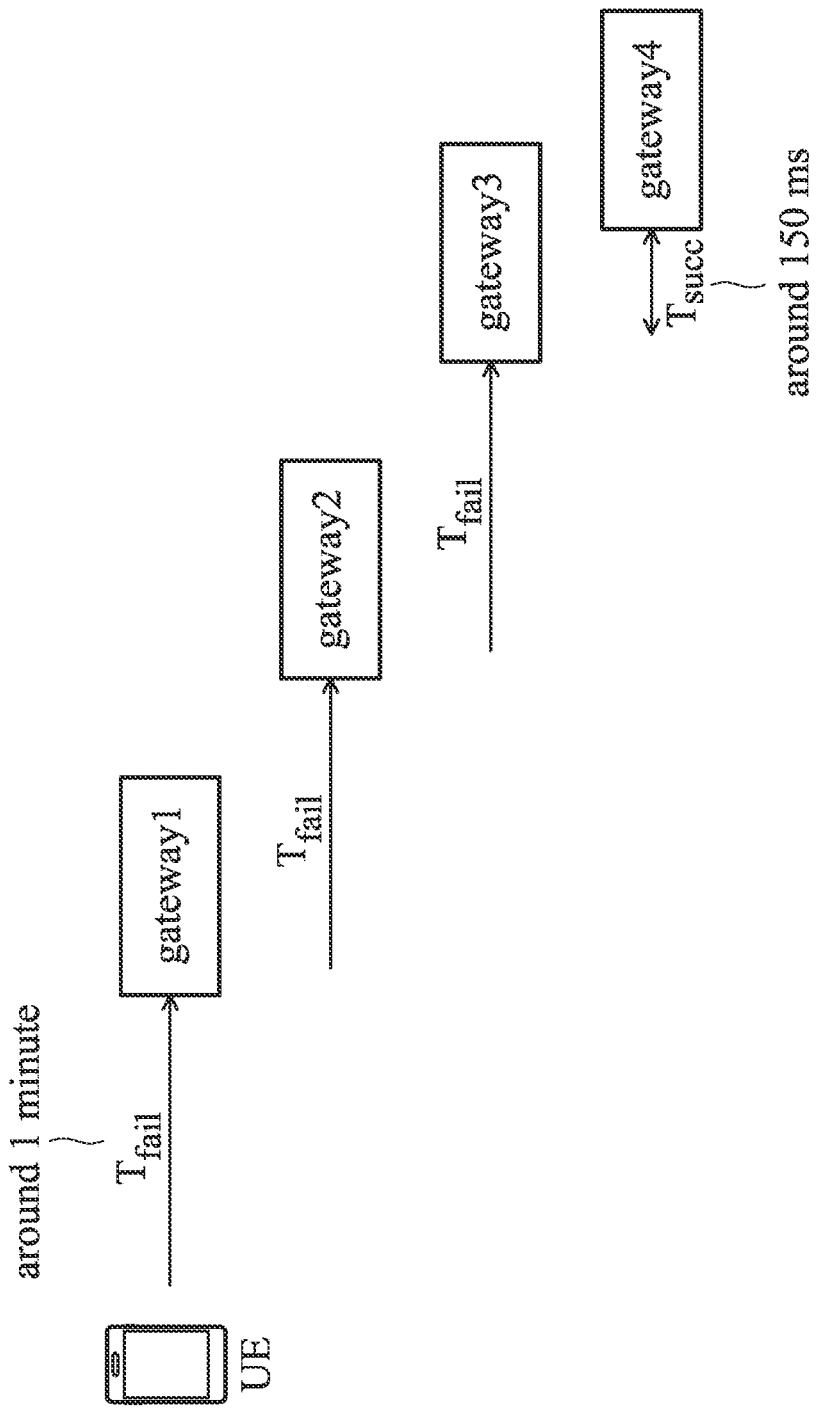
FIG. 1 is a schematic diagram illustrating the tunnel establishment attempts with multiple non-3GPP interworking gateways in conventional practice.
Figure 2:
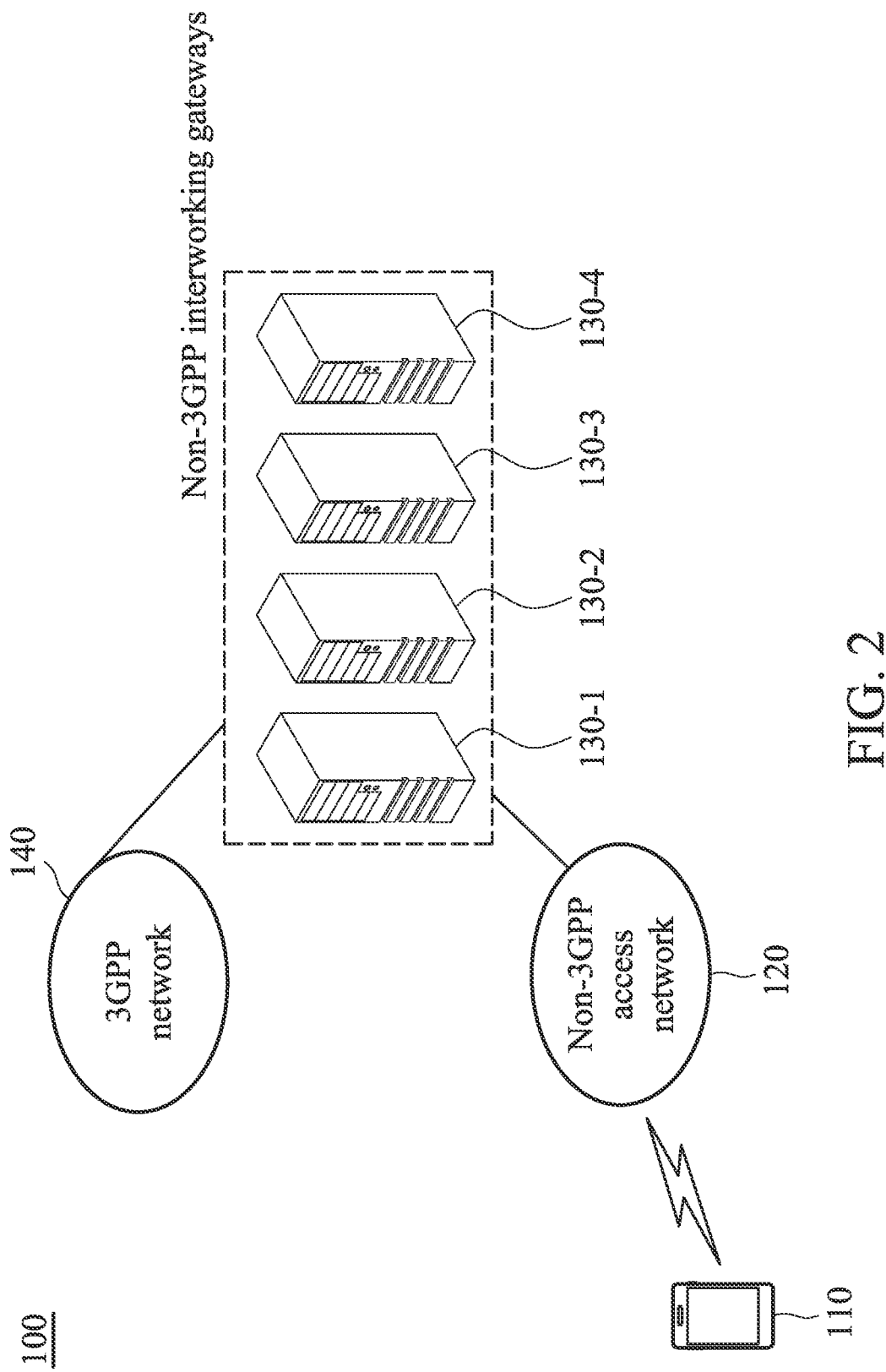
FIG. 2 is a block diagram of a mobile communication environment according to an embodiment of the application.

FIG. 2 is a block diagram of a mobile communication environment according to an embodiment of the application. As shown in FIG. 2, the mobile communication environment 100 includes a UE 110, a non-3GPP access network 120, a plurality of non-3GPP interworking gateways 130-1~130-4, and a 3GPP network 140.

The UE 110 may be a feature phone, a smartphone, a panel Personal Computer (PC), a laptop computer, a Machine Type Communication (MTC) device, or any mobile communication device supporting the RAT(s) utilized by the non-3GPP access network 120 and the 3GPP network 140. The UE 110 may establish a secure tunnel (e.g., an Internet Protocol secure (IPsec) tunnel) with one of the non-3GPP interworking gateways 130-1~130-4, and access the 3GPP network 140 via the secure tunnel to obtain mobile services (e.g., voice and/or data services).

The non-3GPP access network 120 may be a wireless network utilizing an RAT not specified by 3GPP. For example, the non-3GPP access network 120 may be a Wi-Fi network or any future evolution of the Wi-Fi network, a BT network, a Zigbee network, a WiMAX network, or a CDMA network, or a fixed network (e.g., a Digital Subscriber Line (DSL) network), depending on the RAT in use.

Each of the non-3GPP interworking gateways 130-1~130-4 is responsible for enabling interoperability between the non-3GPP access network 120 and the 3GPP network 140. Specifically, each of the non-3GPP interworking gateways 130-1~130-4 may use the Internet Key Exchange version 2 (IKEv2) protocol to provide a secure tunnel between the UE 110 and the 3GPP network 140 over the non-3GPP access network 120 (e.g., a Wi-Fi Access Point (AP)). That is, each non-3GPP interworking gateway may also serve as an IKEv2 server when providing the function of IEKv2 signaling exchange. In one example, each non-3GPP interworking gateway is an evolved Packet Data Gateway (ePDG) if the 3GPP network 140 is a 4G network. In another example, each non-3GPP interworking gateway is a Non-3GPP Inter-Working Function (N3IWF) if the 3GPP network 140 is a 5G network.

The 3GPP network 140 may be a 4G network (e.g., LTE/LTE-A/TD-LTE network) or a 5G network (e.g., NR network), or any further evolution of the 5G network, depending on the RAT in use. To clarify further, the 3GPP network 140 may include an access network and a core network (not shown). The access network is responsible for processing radio signals, terminating radio protocols, and connecting the UE 110 with the core network (if UE 110 chooses the access the 3GPP network 140 over 3GPP access), while the core network is responsible for performing mobility management, network-side authentication, and interfaces with public/external networks, such as the Internet and/or an IP Multimedia Subsystem (IMS).

In one example, if the 3GPP network 140 is a 4G network, the access network may be an Evolved-Universal Terrestrial Radio Access Network (E-UTRAN) and the core network may be an Evolved Packet Core (EPC). The E-UTRAN may include at least an evolved NodeB (eNB) (e.g., a macro eNB, femto eNB, or pico eNB). The EPC may include a Home Subscriber Server (HSS), a Mobility Management Entity (MME), a Serving Gateway (S-GW), and a Packet Data Network Gateway (PDN-GW or P-GW).

In another example, if the 3GPP network 140 is a 5G network, the access network may be a Next Generation Radio Access Network (NG-RAN) and the core network may be a Next Generation Core Network (NG-CN) (i.e., 5G Core Network (5GC)). The NG-RAN may include one or more gNBs. Each gNB may further include one or more Transmission Reception Points (TRPs), and each gNB or TRP may be referred to as a 5G cellular station forming one or more cells, wherein some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

In accordance with one novel aspect, the UE 110 is allowed to start probing availabilities of other non-3GPP interworking gateways (e.g., the non-3GPP interworking gateways 130-2~130-4) before it successfully establishes a secure tunnel with the current non-3GPP interworking gateway (e.g., the non-3GPP interworking gateway 130-1). Advantageously, the UE may establish a secure tunnel with another non-3GPP interworking gateway that has been probed to be available, as soon as it has failed the tunnel establishment with the current non-3GPP interworking gateway.

Figure 3:
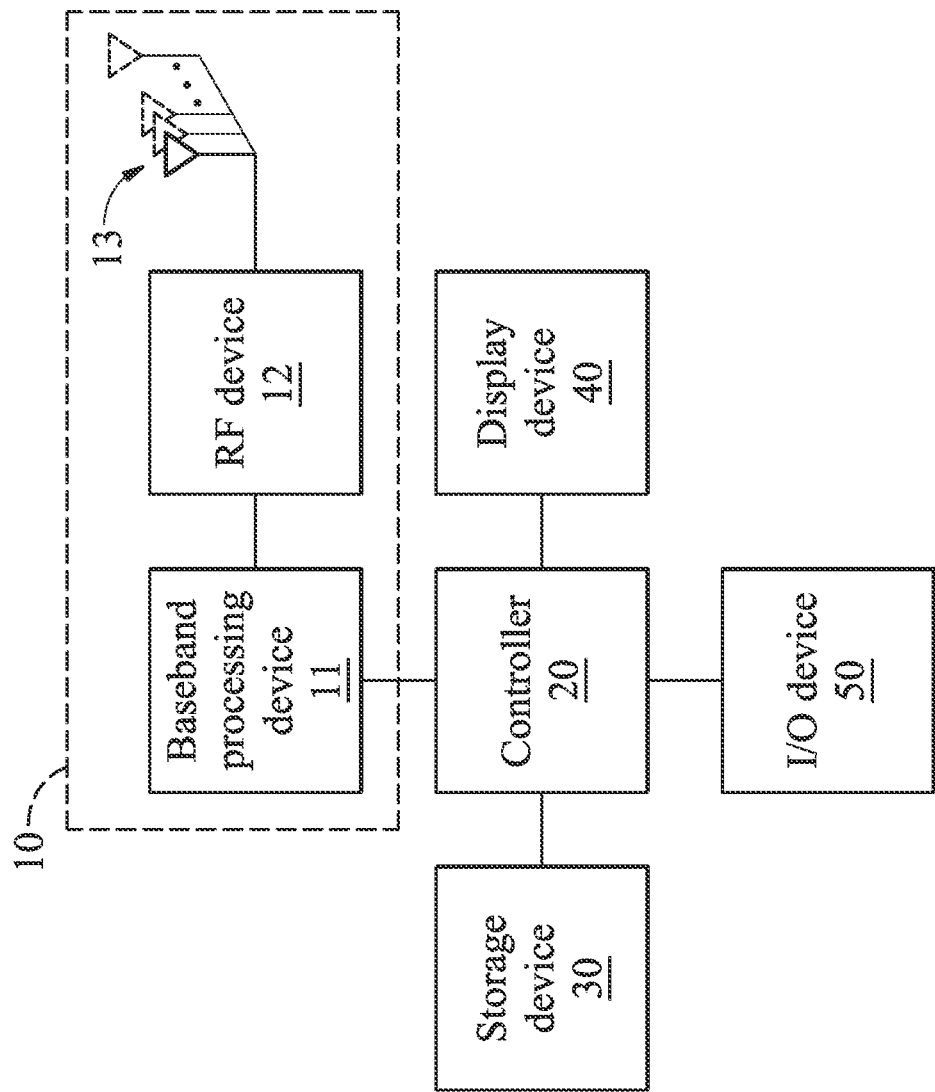
FIG. 3 is a block diagram illustrating a UE according to an embodiment of the application.

FIG. 3 is a block diagram illustrating a UE according to an embodiment of the application.

As shown in FIG. 3, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from the non-3GPP access network 120 and/or the access network of the 3GPP network 140. Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be 900 MHz, 2100 MHz, or 2.6 GHz utilized in 4G LTE/LTE-A/TD-LTE technology, or may be any radio frequency (e.g., 30 GHz~300 GHz for mmWave) utilized in the 5G NR technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the non-3GPP access network 120 and/or the access network of the 3GPP network 140, storing and retrieving data (e.g., a priority list of ePDGs/N3IWFs information) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a non-volatile memory (e.g., a FLASH memory or a Non-Volatile Random Access Memory (NVRAM)), or a Universal Integrated Circuit Card (UICC) (e.g., a Subscriber Identity Module (SIM) or Universal SIM (USIM)), or a magnetic storage device (e.g., a hard disk or a magnetic tape), or an optical disc, or any combination thereof for storing data (e.g., a priority list of ePDGs/N3IWFs information), instructions, and/or program code of applications, communication protocols (e.g., the Internet Key Exchange version 2 (IKEv2) protocol and the 4G/5G protocol), and/or the method of the present application. In one example, the method of the present application may be implemented as part of the 4G/5G protocol. A 4G/5G protocol stack may include a Non-Access-Stratum (NAS) layer to communicate with an AMF/SMF/MME entity in the 3GPP core network, and an Access Stratum (AS) layer consisting of multiple sublayers, such as a Radio Resource Control (RRC) sublayer for high layer configuration and control of, a Packet Data Convergence Protocol/Radio Link Control (PDCP/RLC) sublayer, a Media Access Control (MAC) sublayer, and a Physical (PHY) sublayer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, a UE may include more components, such as a power supply, or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 4:
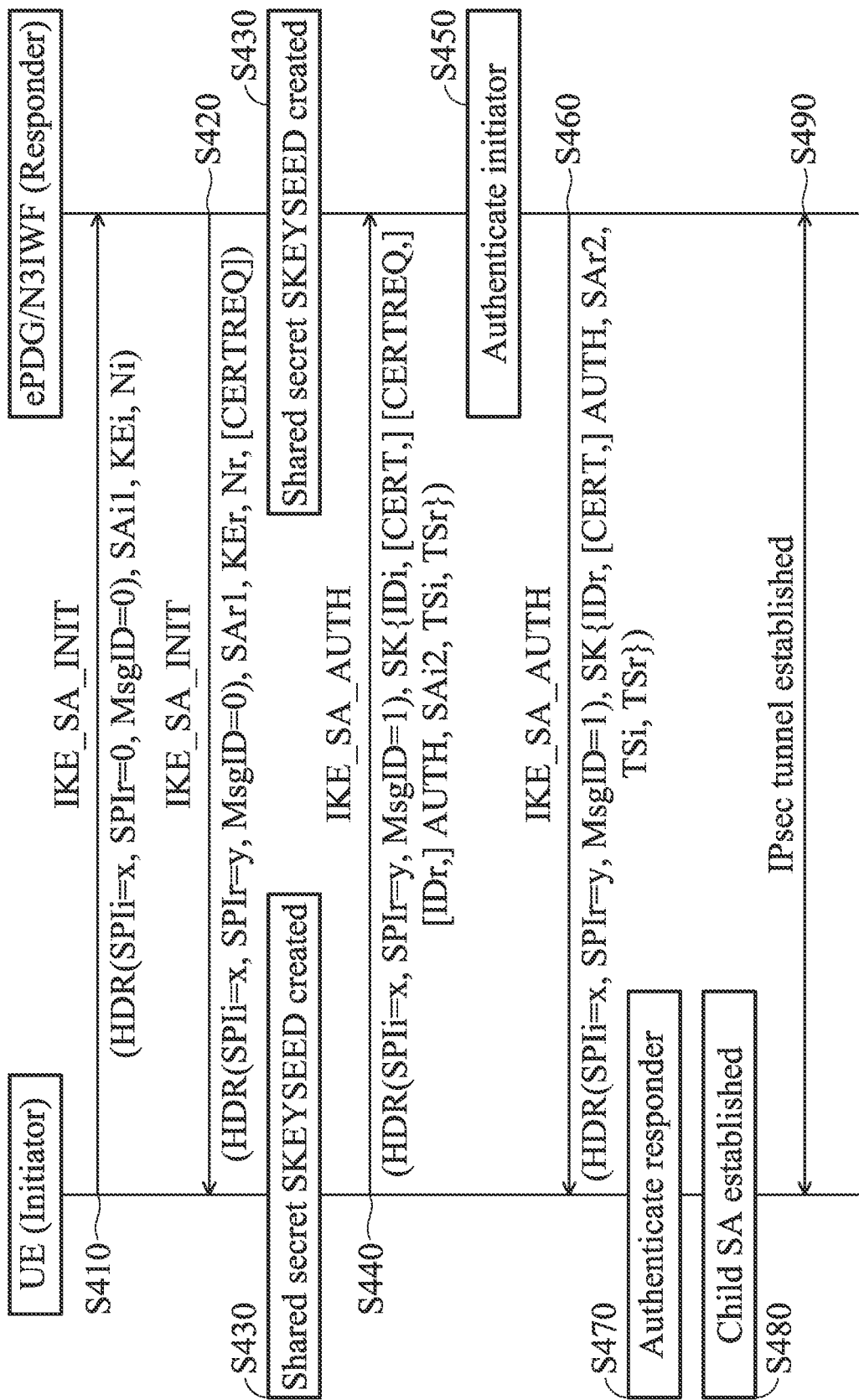
FIG. 4 is a message sequence chart illustrating an exemplary tunnel establishment procedure between a UE and a non-3GPP interworking gateway according to an embodiment of the application.

FIG. 4 is a message sequence chart illustrating an exemplary tunnel establishment procedure between a UE and a non-3GPP interworking gateway according to an embodiment of the application.

In this embodiment, the tunnel establishment procedure is performed using the IKEv2 protocol, but the present application should not be limited thereto.

The first exchange of an IKEv2 activation attempt is the IKE_SA_INIT exchange. Specifically, the UE initiates the tunnel establishment procedure by sending an IKE_SA_INIT request with a list of security association proposals to the ePDG/N3IWF (step S410). Each proposal defines a combination of attributes for the IKE Security Association (SA) that is being negotiated. The UE also includes its nonce and Diffie-Hellman value in the IKE_SA_INIT request.

In response to the IKE_SA_INIT request, the ePDG/N3IWF picks a proposal that is acceptable and returns its choice to the UE in an IKE_SA_INIT response, along with its own nonce and Diffie-Hellman value (step S420).

Once the IKE_SA_INIT exchange completes successfully, both the UE and ePDG/N3IWF can independently generate the identical keying information that supports the IKE SA (step S430).

The second exchange is the IKE_SA_AUTH exchange. This exchange completes the activation of the IKE SA, and also sets up an SA for the first (and often only) Authentication Header (AH) or Encapsulating Security Payload (ESP) child SA. Specifically, the UE sends an IKE_SA_AUTH request that contains its identity, certificate, and authentication information (step S440), and the ePDG/N3IWF authenticates the UE based on the received information (step S450). Subsequently, the ePDG/N3IWF sends an IKE_SA_AUTH response that contains its identity, certificate, and authentication information (step S460), and the UE authenticates the ePDG/N3IWF based on the received information (step S470) and establishes the first child SA to complete activation of the IKE SA (step S480). Alternatively, the IKE_SA_AUTH exchange may include more than one message pair of an IKE_SA_AUTH request and an IKE_SA_AUTH response.

After activation of the IKE SA, the UE successfully establishes an IPsec tunnel with the ePDG/N3IWF (step S490), so that it may access the 3GPP network over the IPsec tunnel.

It should be noted that the IKE_SA_INIT exchange does not include user information, while the IKE_SA_AUTH exchange includes user information, and the 3GPP core network may reject the UE's request if there are two or more ePDGs/N3IWFs answering the UE. This is why the conventional practice needs to perform tunnel establishment with one ePDG/N3IWF at a time. By contrast, in the present application, the probing process only involves the IKE_SA_INIT exchange but not the IKE_SA_AUTH exchange, and thus, the UE is allowed to probe availabilities of multiple ePDGs/N3IWFs before it successfully establishes a secure tunnel with the current ePDG/N3IWF.

Figure 5:
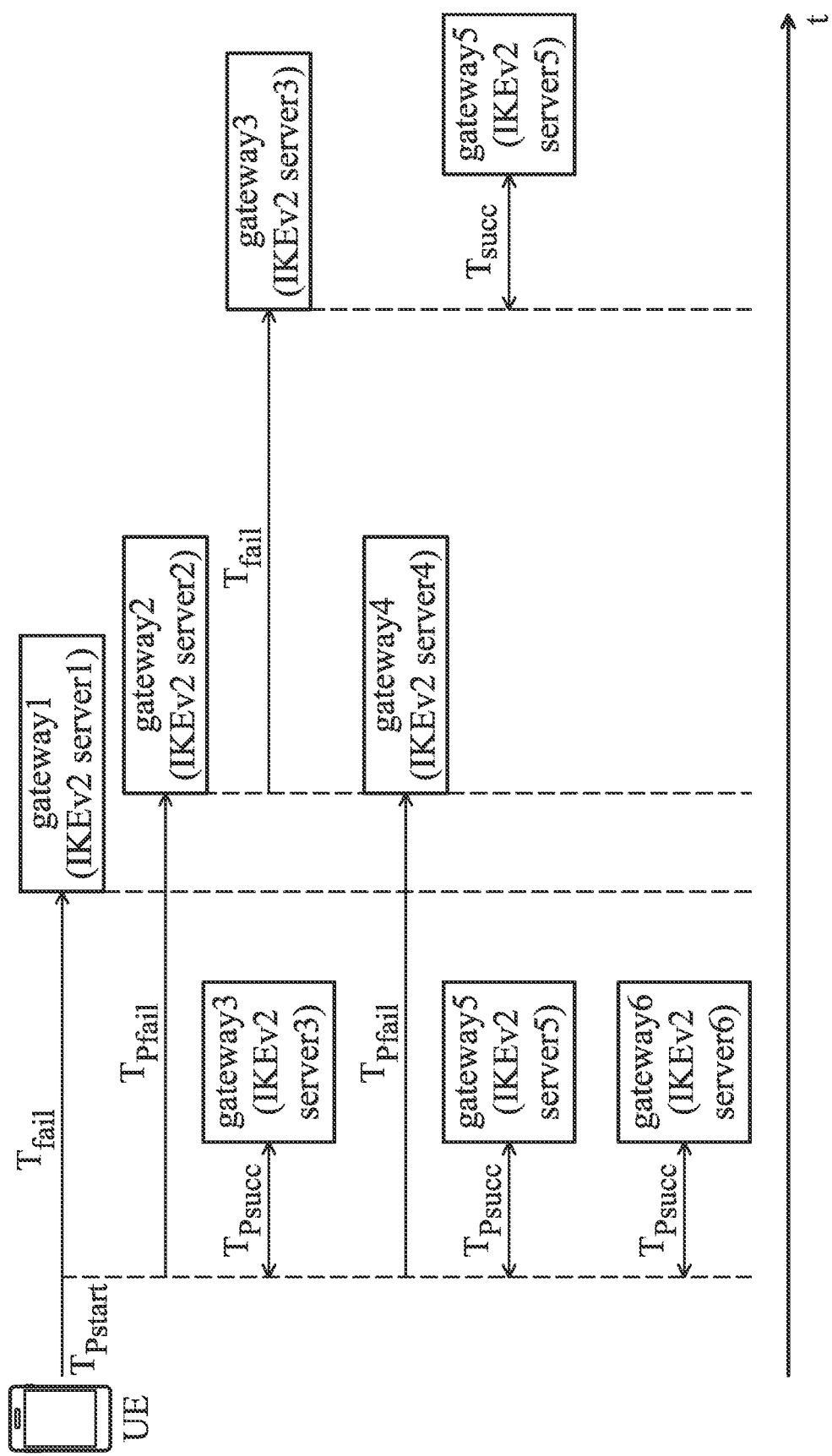
FIG. 5 is a schematic diagram illustrating the expedited tunnel establishment between a UE and multiple non-3GPP interworking gateways according to an embodiment of the application.

FIG. 5 is a schematic diagram illustrating the expedited tunnel establishment between a UE and multiple non-3GPP interworking gateways according to an embodiment of the application.

To begin with, the UE initiates the tunnel establishment procedure with the first non-3GPP interworking gateway, and starts a timer $T_{Pstart}$ in response to the initiation of the tunnel establishment procedure.

Once the timer $T_{Pstart}$ expires, the UE uses the IKE_SA_INIT request to probe at least one of the other non-3GPP interworking gateways in the priority list, e.g., all the other non-3GPP interworking gateways in the priority list in this embodiment. Specifically, the priority list includes information (e.g., IP addresses) about a plurality of non- 3GPP interworking gateways in an order of precedence. In one example, the priority list is provided by the 3GPP network. In another example, the priority list is stored in a SIM/UISM card or an embedded-SIM/USIM (eSIM/eU-SIM).

The UE may repeat this probing process until it has successfully established a secure tunnel with the first non-3GPP interworking gateway, and during the probing process, the UE may keep all the non-3GPP interworking gateways sending IKE_SA_INIT response back to the UE.

As shown in FIG. 5, $T_{fail}$ denotes the period of time in which the UE tries to establish a secure tunnel with the first non-3GPP interworking gateway but fails (i.e., the maximum number of retries is reached), $T_{Pfail}$ denotes the period of time in which the maximum number of retries of sending the IKE_SA_INIT request has been reached and the UE does not receive an IKE_SA_INIT response, and $T_{Psucc}$ denotes the period of time in which an IKE_SA_INIT response is received before the maximum number of retries of sending the IKE_SA_INIT request has been reached.

At the expiration of the timer $T_{Pstart}$, the UE selects the next non-3GPP interworking gateway that has the highest precedence among the rest non-3GPP interworking gateways, and checks whether the selected non-3GPP interworking gateway (i.e., the second non-3GPP interworking gateway) is available. After a period of time denoted as $T_{Pfail}$ has passed, the UE determines that the second non-3GPP interworking gateway is unavailable due to the maximum number of retries of sending the IKE_SA_INIT request having been reached and the UE having not received an IKE_SA_INIT response from the second non-3GPP interworking gateway.

Subsequently, the UE selects the next non-3GPP interworking gateway that has the highest precedence among the rest non-3GPP interworking gateways, and checks whether that the selected non-3GPP interworking gateway (i.e., the third non-3GPP interworking gateway) is available. In response to the third non-3GPP interworking gateway being available, the UE initiates the tunnel establishment procedure with the third non-3GPP interworking gateway. However, the tunnel establishment procedure fails again (e.g., the IKE_SA_INIT exchange may be successful but the KE_SA_AUTH exchange may fail), and the UE goes on to try the next available non-3GPP interworking gateway (i.e., the fifth non-3GPP interworking gateway). At last, the UE successfully establishes a secure tunnel with the fifth non-3GPP interworking gateway, and is able to access the 3GPP network over the secure tunnel.

Although not shown, for each received IKE_SA_INIT response, the UE may start a timer $T_{keep}$ to count a period of time in which the received IKE_SA_INIT response should be kept, and once the timer $T_{keep}$ expires, the UE may delete the IKE_SA_INIT response. Upon initiating the tunnel establishment procedure with the selected non-3GPP interworking gateway, the UE may determine whether the timer $T_{keep}$ has expired, and if not, the UE may skip the IKE_SA_INIT exchange and just start with the IKE_SA_AUTH exchange. Otherwise, if the timer $T_{keep}$ has expired, the UE may start from the IKE_SA_INIT exchange. In other words, the probing process may be a part of the tunnel establishment procedure. Alternatively, if the timer $T_{keep}$ is set to zero, the UE does not keep the received IKE_SA_INIT response, and it always start from the IKE_SA_INIT exchange in the tunnel establishment procedure.

It is observed that the tunnel establishment procedure with the first non-3GPP interworking gateway is usually successful and having all UEs probing all the non-3GPP interworking gateways may cause significant waste of network resources. This is why the present application proposes that the UE only performs the probing process after a period of time in which it has been trying to establish a secure tunnel with the first non-3GPP interworking gateway but not yet successful. Advantageously, network resources of the non-3GPP interworking gateways may be saved, as well as the UE's power consumption.

Figure 6:
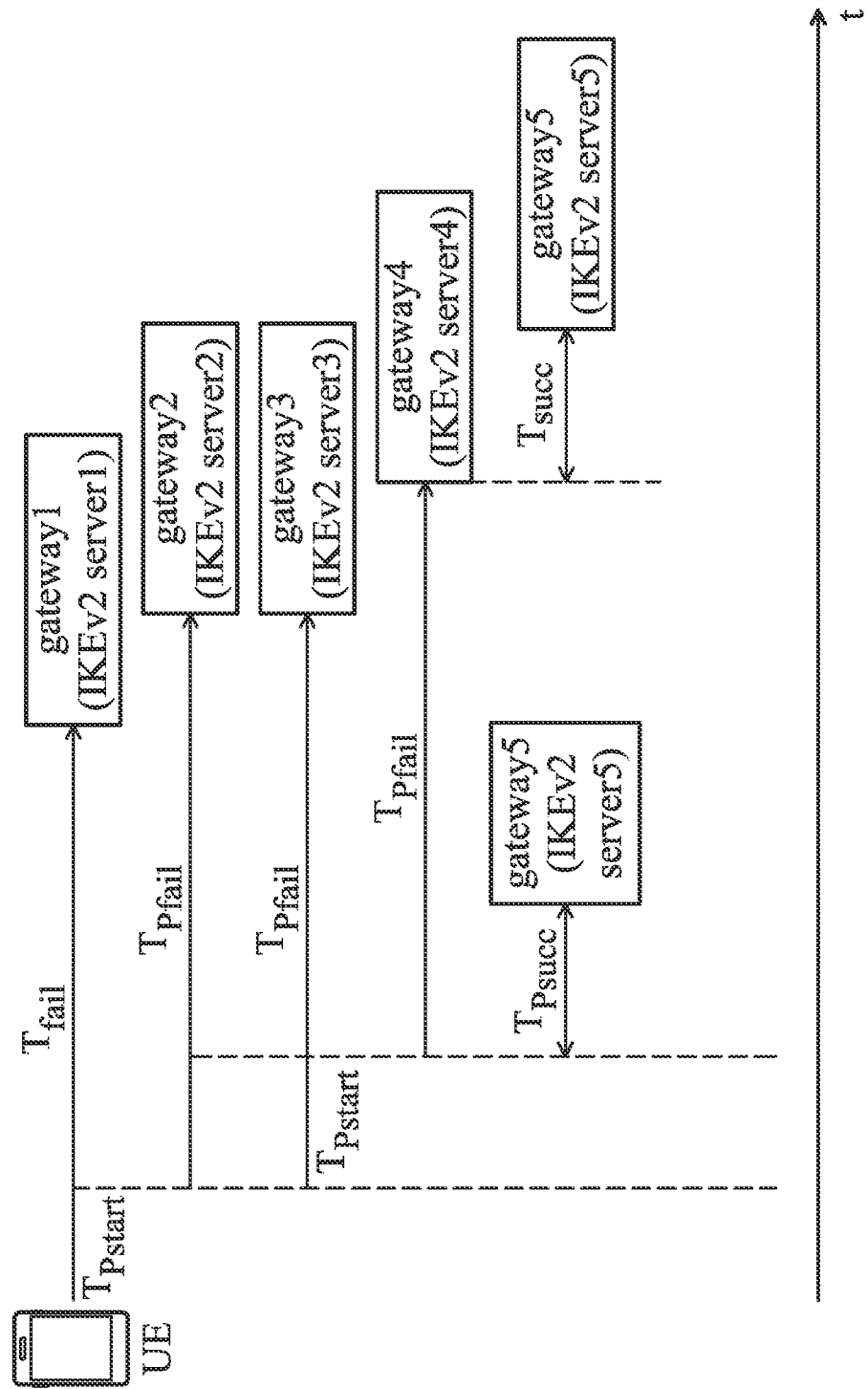
FIG. 6 is a schematic diagram illustrating the expedited tunnel establishment between a UE and multiple non-3GPP interworking gateways according to another embodiment of the application.

FIG. 6 is a schematic diagram illustrating the expedited tunnel establishment between a UE and multiple non-3GPP interworking gateways according to another embodiment of the application.

In this embodiment, the UE only probes a limited number (e.g., Ns=2) of non-3GPP interworking gateways when the timer $T_{Pstart}$ expires. By contrast, in the embodiment of FIG. 5, the UE probes all remaining non-3GPP interworking gateways (i.e., Ns=all) when the timer $T_{Pstart}$ expires. It should be appreciated that the benefit of probing a limited number of non-3GPP interworking gateways at a time can achieve substantial gain in terms of network resource utilization, especially when the total number of non-3GPP interworking gateways in the priority list is large.

As shown in FIG. 6, the UE starts probing the next two non-3GPP interworking gateways when the timer $T_{Pstart}$ expires. After a period of time denoted as $T_{Pfail}$ has passed, the UE determines that the second and third non-3GPP interworking gateways are unavailable due to the maximum number of retries of sending the IKE_SA_INIT request having been reached and the UE having not received an IKE_SA_INIT response from any of them.

In particular, the UE starts the timer $T_{Pstart}$ again upon starting the probing process, and when the timer $T_{Pstart}$ expires and no IKE_SA_INIT response has been received from the second and third non-3GPP interworking gateways, the UE starts probing the next two non-3GPP interworking gateways, and so on. After another period of time denoted as $T_{Pfail}$ has passed, the UE determines that the fourth non-3GPP interworking gateway is unavailable due to the maximum number of retries of sending the IKE_SA_INIT request having been reached and the UE having not received an IKE_SA_INIT response from it. At last, the UE successfully establishes a secure tunnel with the fifth non-3GPP interworking gateway which is probed to be available.

In another embodiment, if the fifth non-3GPP interworking gateway is also unavailable, the UE may repeat the probing process with the next Ns (e.g., Ns=2) non-3GPP interworking gateways in the priority list until it has successfully established a secure tunnel with one non-3GPP interworking gateway. Moreover, if a non-3GPP interworking gateway is probed to be available, the UE may store the information of such non-3GPP interworking gateway, and after the tunnel establishment procedure with the currently selected non-3GPP interworking gateway fails, the UE may use the probed information to initiate the tunnel establishment procedure with such non-3GPP interworking gateway.

Figure 7:
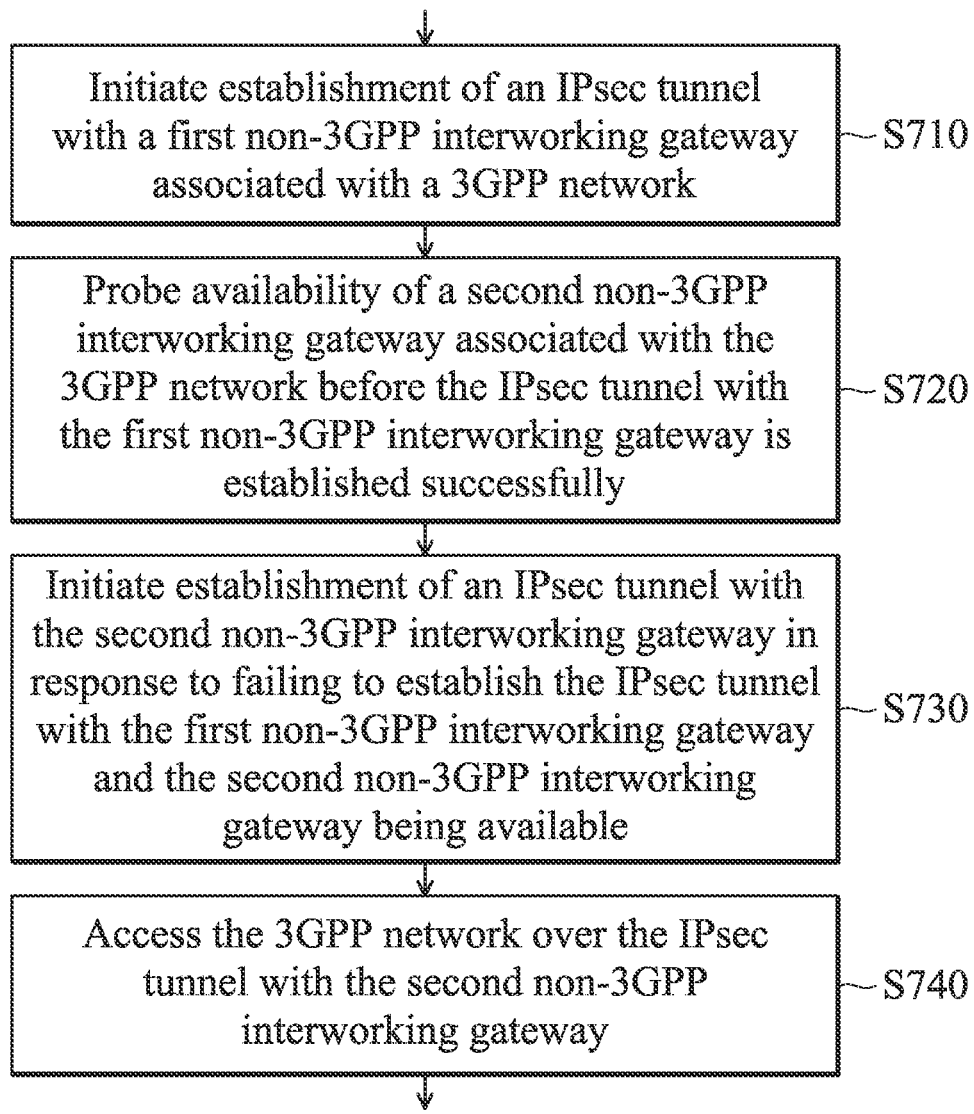
FIG. 7 is a flow chart illustrating the method for expedited tunnel establishment according to an embodiment of the application.

FIG. 7 is a flow chart illustrating the method for expedited tunnel establishment according to an embodiment of the application.

In step S710, the UE initiates establishment of an IPsec tunnel with a first non-3GPP interworking gateway associated with a 3GPP network.

In step S720, the UE probes availability of a second non-3GPP interworking gateway associated with the 3GPP network before the IPsec tunnel with the first non-3GPP interworking gateway is established successfully. In one example, the UE may start a timer (e.g., the timer $T_{Pstart}$) in response to initiating establishment of the IPsec tunnel with the first non-3GPP interworking gateway, and the probing process may be performed when the timer expires before the IPsec tunnel with the first non-3GPP interworking gateway is established successfully.

In step S730, the UE initiates establishment of an IPsec tunnel with the second non-3GPP interworking gateway in response to failing to establish the IPsec tunnel with the first non-3GPP interworking gateway and the second non-3GPP interworking gateway being available. In one example, the UE may determine that it fails to establish the IPsec tunnel with the first non-3GPP interworking gateway, when the maximum number of retries of the tunnel establishment with the first non-3GPP interworking gateway is reached. In one example, the probing process may include sending an IKE_SA_INIT request to the second non-3GPP interworking gateway, and the UE may determine that the second non-3GPP interworking gateway is available when an IKE_SA_INIT response is received from the second non-3GPP interworking gateway.

In step S740, the UE accesses the 3GPP network over the IPsec tunnel with the second non-3GPP interworking gateway.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, executed by a User Equipment (UE), comprising:
   initiating establishment of an Internet Protocol secure (IPsec) tunnel with a first non-Third Generation Partnership Project (3GPP) interworking gateway associated with a 3GPP network;
   probing availability of a second non-3GPP interworking gateway associated with the 3GPP network before the IPsec tunnel with the first non-3GPP interworking gateway is established successfully;
   initiating establishment of an IPsec tunnel with the second non-3GPP interworking gateway in response to failing to establish the IPsec tunnel with the first non-3GPP interworking gateway and the second non-3GPP interworking gateway being available; and
   accessing the 3GPP network over the IPsec tunnel with the second non-3GPP interworking gateway,
   wherein the probing of availability of the second non-3GPP interworking gateway comprises:
   sending an IKE SA INIT request to the second non-3GPP interworking gateway;
   determining that the second non-3GPP interworking gateway is available in response to receiving an IKE SA INIT response from the second non-3GPP interworking gateway; and
   determining that the second non-3GPP interworking gateway is unavailable in response to not receiving an IKE SA INIT response from the second non-3GPP interworking gateway.

2. The method as claimed in claim 1, further comprising:
   starting a first timer in response to initiating establishment of the IPsec tunnel with the first non-3GPP interworking gateway;
   wherein the probing of availability of the second non-3GPP interworking gateway is performed in response to the first timer expiring.

3. The method as claimed in claim 1, further comprising:
   determining that the UE fails to establish the IPsec tunnel with the first non-3GPP interworking gateway in response to a maximum number of retries of the tunnel establishment with the first non-3GPP interworking gateway being reached.

4. The method as claimed in claim 1, wherein the determination that the second non-3GPP interworking gateway is unavailable is performed in response to a maximum number of retries of sending the IKE_SA_INIT request being reached.

5. The method as claimed in claim 1, wherein the probing of availability of the second non-3GPP interworking gateway does not comprise sending or receiving any IKE_SA_AUTH message to or from the second non-3GPP interworking gateway.

6. The method as claimed in claim 1, wherein the probing of availability of the second non-3GPP interworking gateway further comprises:
   starting a second timer in response to receiving an IKE_SA_INIT response from the second non-3GPP interworking gateway.

7. The method as claimed in claim 6, wherein, in response to the second timer not expiring before the initiating of establishment of the IPsec tunnel with the second non-3GPP interworking gateway, the initiating of establishment of the IPsec tunnel with the second non-3GPP interworking gateway does not comprise sending another IKE_SA_INIT request to the second non-3GPP interworking gateway; or wherein, in response to the second timer expiring before the initiating of establishment of the IPsec tunnel with the second non-3GPP interworking gateway, the initiating of establishment of the IPsec tunnel with the second non-3GPP interworking gateway comprises sending another IKE_SA_INIT request to the second non-3GPP interworking gateway.

8. The method as claimed in claim 1, wherein the first non-3GPP interworking gateway has a higher precedence over the second non-3GPP interworking gateway, and the method further comprising:
   probing availability of a third non-3GPP interworking gateway before the IPsec tunnel with the first non-3GPP interworking gateway is established successfully;
   wherein the initiating of establishment of the IPsec tunnel with the second non-3GPP interworking gateway is performed in response to the second non-3GPP interworking gateway having a higher precedence over the third non-3GPP interworking gateway.

9. The method as claimed in claim 1, wherein the non-3GPP interworking gateway is an evolved Packet Data Gateway (ePDG) when the 3GPP network is a fourth Generation (4G) network; or the non-3GPP interworking gateway is a Non-3GPP Inter-Working Function (N3IWF) when the 3GPP network is a fifth Generation (5G) network.

10. A User Equipment (UE), comprising:
a wireless transceiver, configured to perform wireless transmission and reception to and from a non-Third Generation Partnership Project (3GPP) access network; and
a controller, configured to initiate establishment of an Internet Protocol secure (IPsec) tunnel with a first non-3GPP interworking gateway associated with a 3GPP network via the wireless transceiver, probe availability of a second non-3GPP interworking gateway associated with the 3GPP network via the wireless transceiver before the IPsec tunnel with the first non-3GPP interworking gateway is established successfully, initiate establishment of an IPsec tunnel with the second non-3GPP interworking gateway via the wireless transceiver in response to failing to establish the IPsec tunnel with the first non-3GPP interworking gateway and the second non-3GPP interworking gateway being available, and access the 3GPP network over the IPsec tunnel with the second non-3GPP interworking gateway,
wherein the probing of availability of the second non-3GPP interworking gateway comprises:
sending an IKE_SA_INIT request to the second non-3GPP interworking gateway via the wireless transceiver;
determining that the second non-3GPP interworking gateway is available in response to receiving an IKE SA INIT response from the second non-3GPP interworking gateway via the wireless transceiver; and
determining that the second non-3GPP interworking gateway is unavailable in response to not receiving an IKE SA INIT response from the second non-3GPP interworking gateway via the wireless transceiver.

11. The UE as claimed in claim 10, wherein the controller is further configured to start a first timer in response to initiating establishment of the IPsec tunnel with the first non-3GPP interworking gateway, wherein the probing of availability of the second non-3GPP interworking gateway is performed in response to the first timer expiring.

12. The UE as claimed in claim 10, wherein the controller is further configured to determine that the UE fails to establish the IPsec tunnel with the first non-3GPP interworking gateway in response to a maximum number of retries of the tunnel establishment with the first non-3GPP interworking gateway being reached.

13. The UE as claimed in claim 10, wherein the determination that the second non-3GPP interworking gateway is unavailable is performed in response to a maximum number of retries of sending the IKE SA_INIT request being reached.

14. The UE as claimed in claim 10, wherein the probing of availability of the second non-3GPP interworking gateway does not comprise sending or receiving any IKE_SA_AUTH message to or from the second non-3GPP interworking gateway.

15. The UE as claimed in claim 10, wherein the probing of availability of the second non-3GPP interworking gateway further comprises:
starting a second timer in response to receiving an IKE_SA_INIT response from the second non-3GPP interworking gateway.

16. The UE as claimed in claim 15, wherein, in response to the second timer not expiring before the initiating of establishment of the IPsec tunnel with the second non-3GPP interworking gateway, the initiating of establishment of the IPsec tunnel with the second non-3GPP interworking gateway does not comprise sending another IKE_SA_INIT request to the second non-3GPP interworking gateway; or
wherein, in response to the second timer expiring before the initiating of establishment of the IPsec tunnel with the second non-3GPP interworking gateway, the initiating of establishment of the IPsec tunnel with the second non-3GPP interworking gateway comprises sending another IKE_SA_INIT request to the second non-3GPP interworking gateway.

17. The UE as claimed in claim 10, wherein the first non-3GPP interworking gateway has a higher precedence over the second non-3GPP interworking gateway, and the controller is further configured to probe availability of a third non-3GPP interworking gateway before the IPsec tunnel with the first non-3GPP interworking gateway is established successfully, and the initiating of establishment of the IPsec tunnel with the second non-3GPP interworking gateway is performed in response to the second non-3GPP interworking gateway having a higher precedence over the third non-3GPP interworking gateway.

18. The UE as claimed in claim 10, wherein the non-3GPP interworking gateway is an evolved Packet Data Gateway (ePDG) when the 3GPP network is a fourth Generation (4G) network; or the non-3GPP interworking gateway is a Non-3GPP Inter-Working Function (N3IWF) when the 3GPP network is a fifth Generation (5G) network.

* * * * *